United States Patent [19]

Smith et al.

[11] Patent Number: 5,211,439
[45] Date of Patent: May 18, 1993

[54] CURVILINEAR SLIDING VISOR

[75] Inventors: Nels R. Smith, Holland; Jerry M. De Jong, West Olive, both of Mich.

[73] Assignee: Prince Corporation, Holland, Mich.

[21] Appl. No.: 861,025

[22] Filed: Mar. 31, 1992

[51] Int. Cl.⁵ .............................................. B60J 3/02
[52] U.S. Cl. ................................... 296/97.8; 296/97.4
[58] Field of Search ................... 296/97.8, 97.4, 97.1; 160/370.2

[56] References Cited

U.S. PATENT DOCUMENTS

| | | | |
|---|---|---|---|
| 2,289,644 | 7/1942 | Gano, Jr. | 160/370.2 |
| 2,559,471 | 7/1951 | Schrock | 296/97.8 |
| 2,829,003 | 4/1958 | Moyes | 296/97.8 |
| 4,149,749 | 4/1979 | Canal | 296/97.8 |
| 4,468,062 | 8/1984 | Marcus et al. | 296/97.8 |
| 4,491,360 | 1/1985 | Fleming | 296/97.8 |
| 4,492,404 | 1/1985 | Marcus et al. | 296/97.8 |
| 4,844,530 | 7/1989 | Mahler et al. | 296/97.1 |
| 4,929,014 | 5/1990 | Clark et al. | 296/97.8 |
| 4,986,592 | 1/1991 | Kaiser et al. | 296/97.8 |
| 4,989,910 | 2/1991 | Mersman et al. | 296/97.4 |

FOREIGN PATENT DOCUMENTS 1102089 2/1968 United Kingdom .

Primary Examiner—Robert R. Song
Attorney, Agent, or Firm—Price, Heneveld, Cooper, DeWitt & Litton

[57] ABSTRACT

A curvilinear visor panel is coupled to a mounting member by a pair of spaced guide members which extend through angled slots formed in one of the visor panels or mounting members such that the visor panel is extended for use by withdrawing the panel with the guide members moving along the slot for controlled movement of the visor. In a preferred embodiment of the invention, each of the guide members include a thrust washer and a lubricious floating slide member which provide a controlled engaging force between the visor panel and mounting member. In a preferred embodiment of the invention also, the guide member includes a cap with a collar extending though the angled slots with the caps engaging the slots on a side opposite the slide members.

23 Claims, 3 Drawing Sheets

CURVILINEAR SLIDING VISOR

BACKGROUND OF THE INVENTION

The present invention pertains to automotive visors and particularly to a curved sliding visor assembly.

There exists a variety of visor designs which provide visors which extend outwardly from a storage position behind a vehicle headliner. Such construction is represented, for example, by U.S. Pat. Nos. 4,491,360; 4,492,404; and 4,989,910. In order to provide a smooth acting control for the movement of the visors from behind the headliner outwardly to a lowered use position, typically multiple pivot arms or a synchronized rack and pinion guide mechanism have been used to provide stable, smooth operation of the visor in its movement.

Sliding planar visors which extend in edge tracks and include stabilizing mechanisms are also known and are typified by U.S. Pat. No. 4,149,179. Such visors tend to bind or stick due in part to widely varying temperatures to which a visor positioned immediately adjacent the roof are subjected in the automotive environment. A visor which extends behind the headliner must be capable of withstanding large temperature differentials during their operation and still provide approximately the same general operational characteristic or "feel" to the user. A sliding mechanism such as a rectangular visor panel captively held at opposite edges in tracks will not provide this desired visor control. In compactly designed vehicles where roof lines are severely angled and space in the headliner area is at a premium, the use of a large conventional slide mechanism is impractical.

SUMMARY OF THE PRESENT INVENTION

In order to overcome the difficulties of providing an inexpensive, reliable and yet consistently performing slide-out visor, the visor mechanism of the present invention preferably includes a curvilinear visor panel coupled to a mounting member by a pair of spaced guide members which extend through angled slot means formed in one of the visor panels or mounting members such that the visor panel is extended for use by withdrawing the panel with the guide members moving along the slot means for controlled movement of the visor.

In a preferred embodiment of the invention, each of the guide members include spring means and a lubricious floating slide member which provide a controlled engaging force between the visor panel and mounting member. In a preferred embodiment of the invention also, the spring means is a thrust washer which extends between a floating washer and the visor panel and the guide means includes a cap with a collar extending through the angled slots.

This construction thus provides a slide-out visor which is relatively inexpensive, reliable and provides a constant feel to the visor panel for a wide range of operating conditions including varying temperatures. This structure provides for the extension of a visor panel from behind the headliner with a minimal amount of space being required for its storage. These and other features, objects and advantages of the present invention will become apparent upon reading the following description thereof together with reference to the accompanying drawings in which:

DETAILED DESCRIPTION OF THE PREFERRED EMBODIMENT

Figure 1:
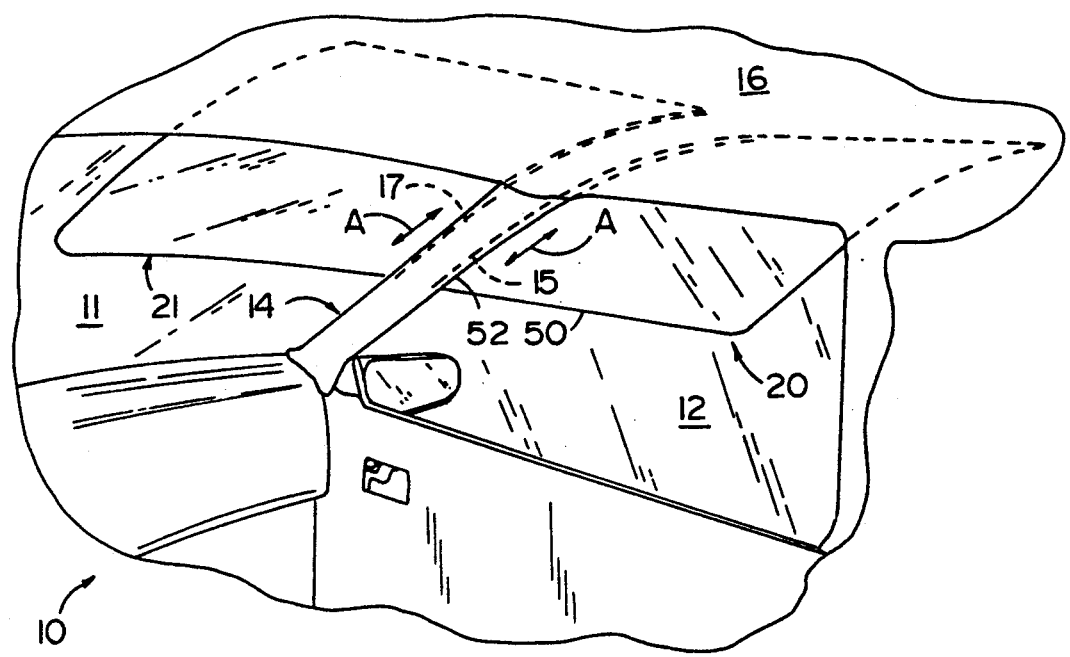
FIG. 1 is a perspective view of a vehicle embodying the present invention.

Referring initially to FIG. 1, there is shown a vehicle 10 such as an automobile which includes a visor system embodying the present invention. The vehicle includes a front windshield 11, a passenger side window 12 between which there extends an A-pillar 14. In the preferred embodiment of the invention, the A-pillar includes a rearward facing slot 15 into which a forward edge of a visor panel 50 loosely extends for secondary guiding and support. The visor panel 50 is part of a visor assembly 20 integrated with the headliner 16 mounted to the roof of the vehicle in a conventional manner. Near the front windshield area, a second visor assembly 21 is also mounted to the headliner 16 and includes a right edge which extends in a forward facing slot 17 in A-pillar 14 for supplemental support. Each of the visor assemblies 20 and 21 include visor panels which move upwardly and downwardly between a raised stored position shown generally in phantom lines in FIG. 1 to a lowered use position shown in solid lines in a direction indicated by Arrow A. The vehicle 10 may include several substantially identical visor assemblies each with a visor panel shaped to conform to the particular window with which the visor installation is associated.

Figure 2:
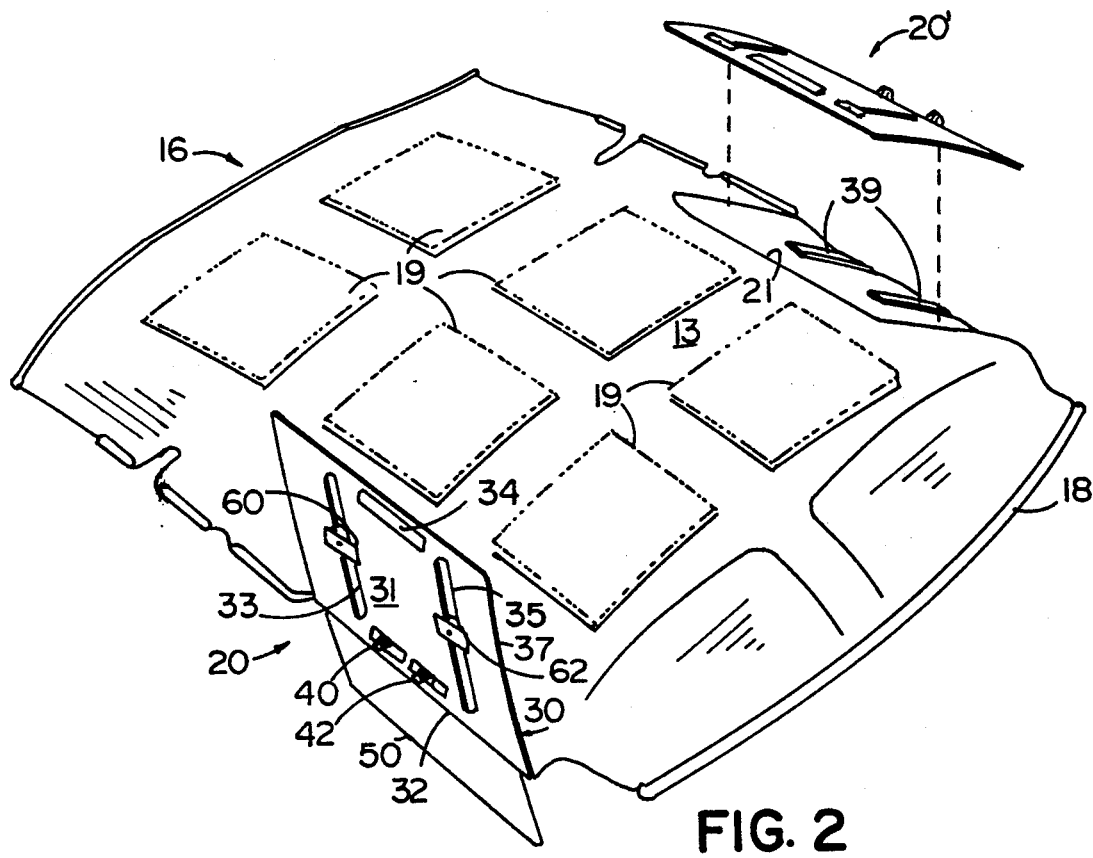
FIG. 2 is an upper front perspective view, partly exploded, of a headliner including a pair of visor assemblies embodying the present invention.

FIG. 2 is a perspective view of the headliner removed from the vehicle and showing a pair of side window visor assemblies incorporating the present invention and is now described in detail.

Referring now to FIG. 2, there is shown the headliner 16 which can be molded of a suitable material such as a polymeric foam material, fibrous mat or the like and covered on its interior facing surface with suitable upholstery material for the interior of the vehicle. Mounted to pockets 21 formed in each side of the headliner near the forward passenger windows are a right side visor assembly 20 and a left side visor assembly 20'. Similar installations can be placed for a pair of front windshield visors if desired near the forward end 18 of headliner 16.

The headliner is a subassembly which can include a variety of accessories such as maplamps and assist handles in addition to the visor assemblies and can be preassembled prior to installation in the vehicle in a conventional manner which may include, for example, the provision of attachment pads 19 which adhesively or otherwise attach the headliner to the sheet metal structure of the vehicle roof. Each of the visor assemblies 20 and 20' are substantially identical and their exact configuration, as mentioned above, can be varied somewhat from that shown in FIG. 2. Each assembly, however, includes a mounting member 30 which is secured to apertures in the vehicle metal roof supports by means of a pair of spaced spring clips 40 and 42 along a lower edge 32 of the mounting member. In the embodiment shown, an anti-vibration pad 34 is also provided on the generally rectangular mounting member 30 near the top edge for holding the mounting member against the roof and eliminating excessive vibration.

Figure 3:
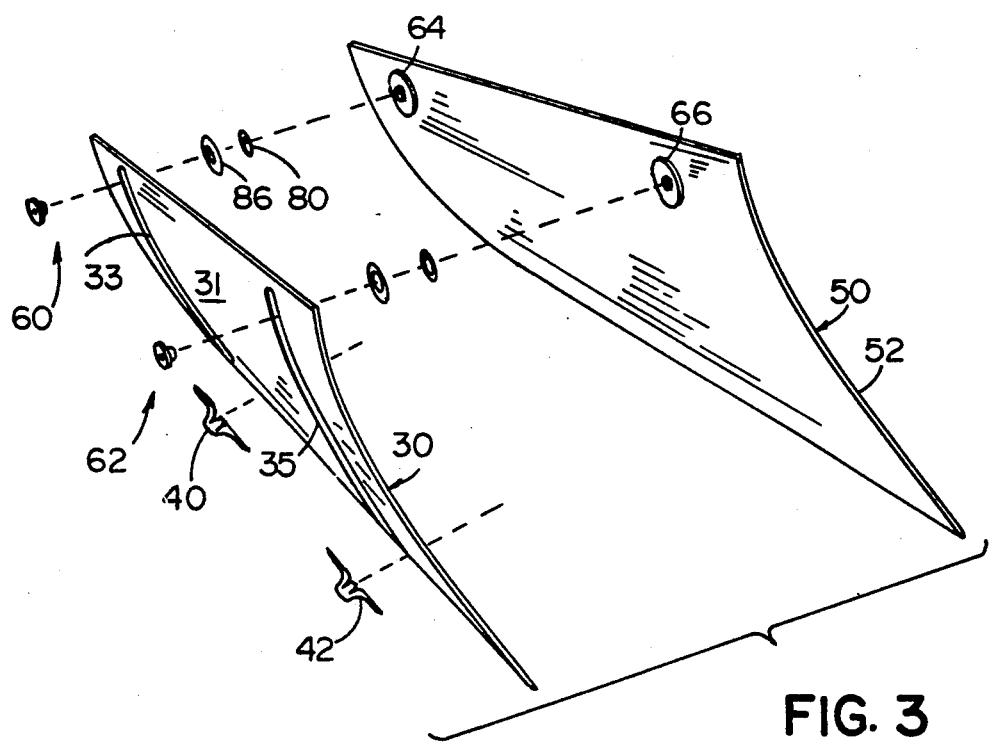
FIG. 3 is an enlarged exploded perspective view of a visor assembly embodying the present invention.

The mounting member, in the preferred embodiment shown in FIGS. 2–5, includes a pair of elongated generally vertically oriented slots 33 and 35 which, in the preferred embodiment as best seen in FIG. 3, are inclined rearwardly to forwardly from top and bottom respectively for moving the visor panel 50, slidably mounted thereto, forwardly as it is lowered. As best seen in FIG. 3, the mounting member 30 and visor panel 50 are curved to conform the panel to the general curvature of the headliner and window surfaces so that the mounting member 30 can be conveniently located in the space between the upper surface 13 of headliner 16 and the underlying sheet metal support of the vehicle roof.

The spring mounting clips 40 and 42 are attached to the lower edge 32 of mounting member 30 by a suitable bonding adhesive or can be integrally molded in the polycarbonate molded support member if desired. These clips snap-fit and lockably attach the lower edge of the panel shaped mounting member 30 to rectangular apertures (not shown) in the sheet metal roof of the vehicle in a conventional manner. The outer side 31 of panel 30 thus faces the sheet metal roof of the vehicle while the inner side 37 is attached to the headliner and particularly to the pocket 21 of the headliner in spaced relationship to the outer surface 13 of the headliner to allow sufficient clearance for the sliding visor panel 50 to move between the inner surface 37 of mounting member 30 and outer surface 13 of headliner 16. Panel 30 can be attached to the headliner in a variety of conventional manners such as by hook-and-loop fasteners 39 shown in FIG. 2, by bonding adhesives, or by other suitable means.

Figure 4:
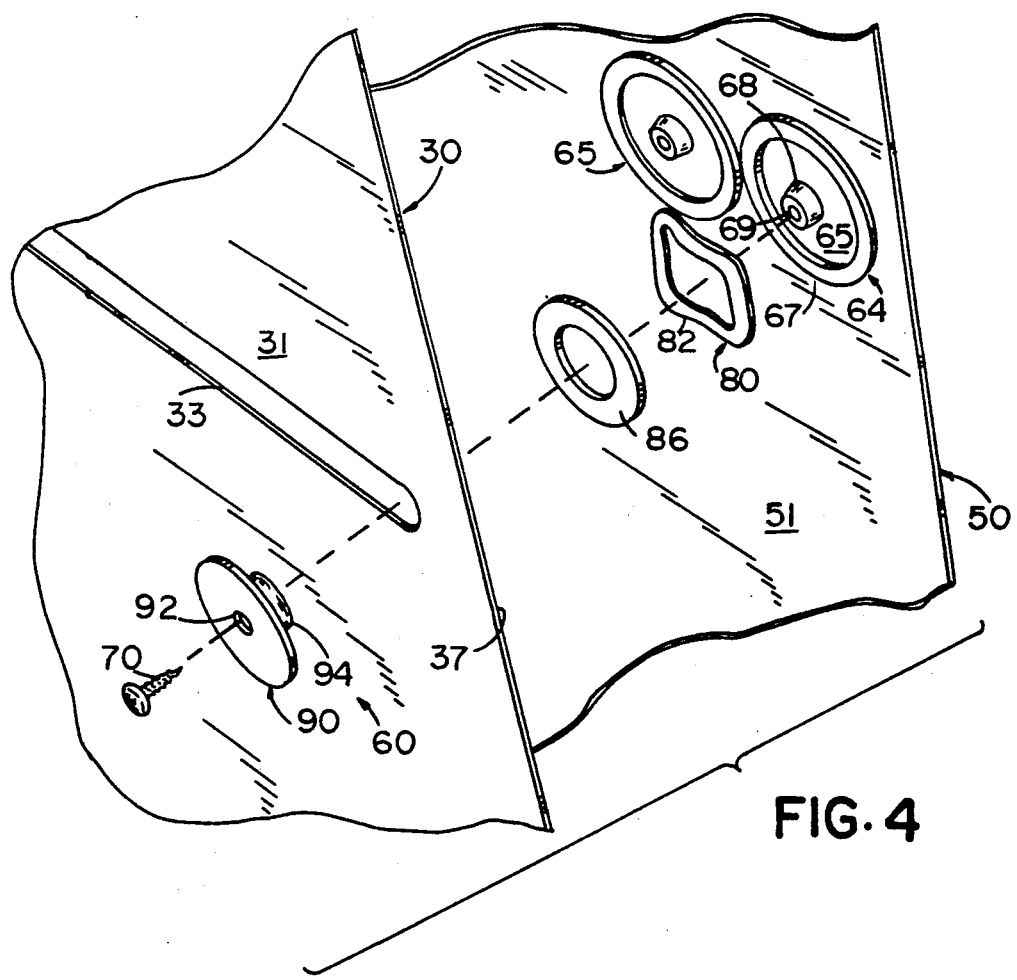
FIG. 4 is a greatly enlarged fragmentary exploded view of a portion of the structure shown in FIG. 3.

The visor panel 50 is slidably attached to mounting member 30 to be guided along the angled slots 33 and 35 by guide means 60 and 62, best seen in FIGS. 3 and 4. Integrally mounted at the upper corners of visor panel 50 is at least one spring and guide retainer seat 64 associated with guide means 60 and a similar retainer seat 66 associated with guide means 62. Panel 50 is integrally molded and includes the seats 64 and 66 therein which are best seen in FIG. 4 which shows retainer seat 64 and an optional second retainer seat 65' for a second optional parallel spaced guide means (not shown) of identical construction to guide means 60 now described. The seat 64 includes a raised annular ring 67 surrounding and in concentric spaced relationship to a truncated conical mounting boss 68 having a central aperture 69 formed therein for receiving a fastening screw 70.

Figure 5:
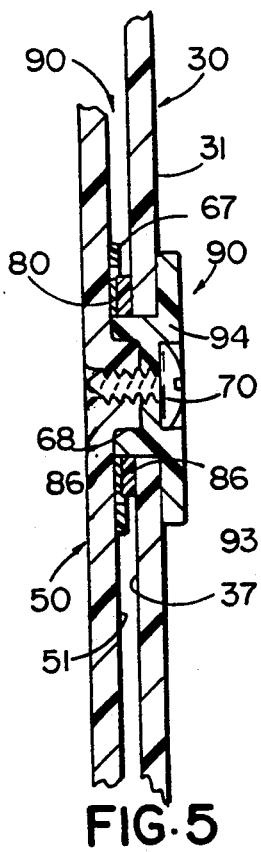
FIG. 5 is an enlarged fragmentary cross-sectional view of an assembled portion of the structure shown in FIG. 4.

In the annular space between the outer surface of mounting boss 68 and the inner edge of annular ring 67, there is supported spring means 80 in the form of a thrust washer having curved sides 82 against which there is positioned a lubricious polymeric slide washer 86 which overlies the spring and engages the inner surface 37 of mounting member 30 adjacent the edges of slot 33. Extending through slot 33 from the opposite side 31 of mounting member 30 is a cap 90 having a central aperture 92 therein for receiving fastening screw 70 and a reduced diameter circular collar 94. The outer surface of collar 94 extends through slot 33, through washer 86, and spring 80. The free end of collar 94 abuts against the floor 65 on seat 64 as best seen in FIG. 5. As also seen in FIG. 5, spring or thrust washer 80 urges slide washer 86 against surface 37 of the mounting member which is engaged on the opposite side by the inner surface 93 of cap 90 to provide a constant pressure sufficient to allow the visor panel 50 to be easily extended and retracted guided by slots 33 and 35 and yet hold the visor in a selected adjusted position.

In a preferred embodiment, the compressive force provided by a thrust spring or washer 80 provided a 1½ to 3½ pound force required to slide visor panel 50 downwardly from a stored position. The forward edge 52 of visor panel 50 extends within the slot 15 in the vehicle A-pillar 14 in loosely guided relationship to provide a continuous seal against sunlight for the triangular front corner area of the side window 12. Panel 50 therefore, is arcuately curved to provide the desired mating with the vehicle headliner and side window and is tapered along its forward edge to conform to the forward angle of the A-pillar and side window as best seen in FIG. 1. Each of the guides 60 and 62 are of substantial identical construction and if desired in some embodiments, an additional guide assembly can be provided and mounted immediately adjacent guide assembly 60 as shown in FIG. 4 with the guide seat 65' being positioned adjacent the seat 64 and in alignment with slot 33. The utilization of two guide means for each of the slots generally will be unnecessary but if employed, provides even greater stability to the visor panel in its sliding motion along the inclined or angled slots 33 and 35. By providing the inclined slots which lower the visor panel 50 downwardly and forwardly in a direction indicated by Arrow A in FIG. 1, the outer wall of collar 94 tends to ride against one edge of the slots thereby preventing skewing or chucking of the visor panel as it is moved. Use of a pair of spaced guides at each of the slots therefore will generally be unnecessary, but can be provided if desired. As seen in FIG. 5, there exists a gap 95 between the inner surface 51 of visor panel 50 and the outer surface 37 of mounting member 30 to allow free sliding motion of the panel 50 with respect to mounting member 30 and allow controlled sliding motion through only the guide means 60 and 62.

Figure 6:
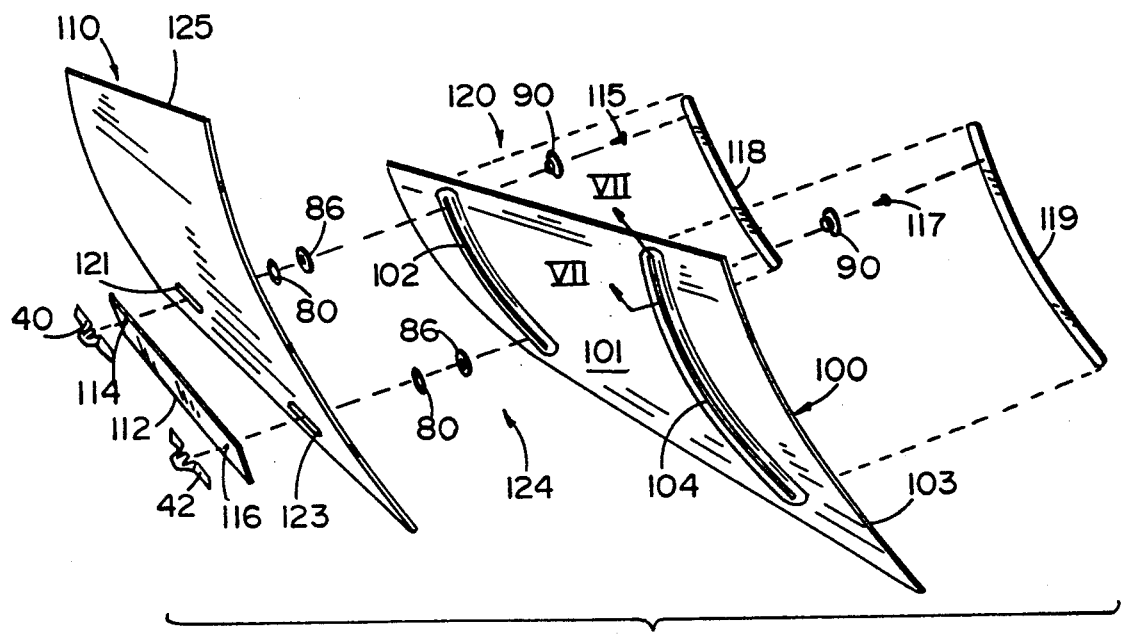
FIG. 6 is an exploded perspective view of an alternative embodiment of the present invention.

An alternative embodiment of the present invention is shown in FIG. 6 in which a visor panel 100 includes a pair of inclined slots 102 and 104 which are attached to a mounting member assembly 110 which includes a mounting plate 112 having spaced apertures 114 and 116 for receiving fastening screws 115 and 117 for guide means 120 and 124 which are substantially identical to guide means 60 and 62 with the differences explained below. The mounting member assembly 110 also includes a pair of spring clips 40 and 42 identical to the spring clips of the previous embodiment. A protective backing panel 125 extends between mounting plate 112 and the rear surface 101 of visor panel 100 for providing scratch resistance to the visor surface. Fasteners 40 and 42 snap-fit into apertures in the roof sheet metal support structure as in the earlier embodiment.

Figure 7:
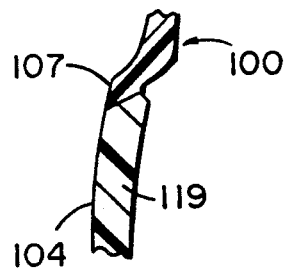
FIG. 7 is an enlarged fragmentary cross-sectional view taken along section lines VII—VII of FIG. 6.

The fastening screws 115 and 117 each extend through a cap 90 identical to cap 90 described in the first embodiment through slots 102 and 104 and through a slide washer 86, a thrust washer or spring 80 and through slots 121 and 123 at the lower edge of panel 125. The screws then pass through the indexing apertures 114 and 116 of the stamped metal mounting bar 112 and into threaded apertures at the center of the snap-in fittings 40 and 42. As best seen in FIG. 7, each of the slots 102 and 104 are formed in an integrally molded recessed section 107 of the integrally molded polycarbonate panel 100. Trim strips or covers 118 and 119 are snap-fitted into the recesses 107 to provide a neat trim appearance to the interior exposed surface 103 of visor panel 100. Thus, in the embodiment shown in FIGS. 6 and 7, the visor includes the guide slots and the recessed area 107 provides clearance for the cap and covers provide a trim appearance to the exposed surface of the visor. The visor also includes a tapered forward edge for providing sun protection to the A-pillar area of the vehicle. Member 125 may be of a thin sheet polymeric material, a thin fiberboard or other material which need not be structurally rigid as in the first embodiment for providing scratch resistance. The mounting bar 112 provides indexing and location of the now fixed guide means over which the visor panel 100 including slots 102 and 104 slide during their operation.

Thus, in the first embodiment, the guide means move with the visor body and slots on a fixed mounting bracket whereas in the second embodiment, shown in FIGS. 6 and 7, the guide means are stationary and the visor is slotted for relative movement of the visor panel with respect to the mounting member. In some embodiments of the invention, the mounting member may be integrated into the vehicle, however, for modular assembly techniques it is preferable to incorporate the visor assemblies in the vehicle headliner and subsequently install the preassembled headliner and accessories including the visor assemblies to the vehicle. The guide means in the preferred embodiment employs a cap made of a lubricious polymeric material such as Celcon as is the sliding washer 86 thus the facing surfaces which engage the opposite sides of the mounting member of the first embodiment or the visor in the alternative embodiment provide a lubricious polymeric material between which the polycarbonate visor or backing member rides under a controlled compressive force provided by the thrust washer 80 in each of the embodiments. This provides a smooth controlled nonsticking action to the visor movement between a raised stored position concealed behind the headliner to selectable lowered use positions extended from the headliner.

These and various other modifications to the preferred embodiments of the present invention will become apparent to those skilled in the art but will fall within the scope and spirit of the present invention as defined by the appended claims.

The embodiments of the invention in which an exclusive property or privilege is claimed are defined as follows.

1. A visor system comprising:
 a visor panel;
 a mounting member including means for securing said mounting member to a vehicle roof behind a vehicle headliner, wherein one of said visor panel and mounting member includes at least a pair of spaced elongated generally parallel extending slots formed therein; and
 guide means extending through said slots for coupling said visor panel and said mounting member for sliding movement along said slots, wherein said guide means include means positioned on opposite sides of said slots and engaging the opposite surfaces of the member, in which said slots are formed, with a predetermined compression for providing a controlled sliding force for said visor panel.

2. The visor system as defined in claim 1 wherein said visor panel is curved to conform to the curvature of a vehicle headliner and window with which said visor panel is used.

3. The visor system as defined in claim 2 wherein said means positioned on opposite sides of said slots includes a slide member and a cap having a collar and wherein said slide member extends on one side of said slots and said cap extends on an opposite side.

4. The visor system as defined in claim 3 wherein said guide means further includes spring means for urging said slide member toward said cap.

5. The visor system as defined in claim 4 wherein said slide member comprises a washer-shaped member.

6. The visor system as defined in claim 5 wherein said slots are formed in said mounting member.

7. The visor system as defined in claim 6 wherein said spring means comprises a thrust washer surrounding said collar of said guide means.

8. The visor system as defined in claim 7 wherein said visor panel includes seat means for captively holding said thrust washer.

9. The visor system as defined in claim 8 wherein said cap includes a central aperture and said seat includes a central projection for aligning said cap to said seat.

10. The visor system as defined in claim 9 and further including fastening means for securing said cap to said visor panel.

11. The visor system as defined in claim 5 wherein said slots are formed in said visor panel.

12. The visor system as defined in claim 11 wherein said mounting member comprises an elongated plate including means for fastening said plate to a vehicle support member, said plate further including aperture means spaced to align with said slots.

13. The visor system as defined in claim 12 wherein said guide means are secured to said fastening means through said aperture means in said elongated plate.

14. The visor system as defined in claim 13 and further including a protective panel extending between said elongated plate and said visor panel.

15. The visor system as defined in claim 14 wherein said slot means in said visor panel includes recesses on a side facing the interior of the vehicle when installed and further including cover caps extending within said recesses to provide a finished appearance to said visor panel.

16. A visor system for a vehicle comprising:
 a curved visor panel including first and second spaced seats formed near one edge thereof;
 a mounting member including a pair of parallel spaced slots formed therein and spaced a distance equal to the distance between said seats of said visor panel; and
 guide means extending through said slots of said mounting means into said visor panel for providing a predetermined sliding force for said visor panel with respect to said mounting member as said visor panel slidably moves between a retracted position behind a vehicle headliner and an extended position covering a vehicle window.

17. The visor system as defined in claim 16 and further including clip means mounted to said mounting member for securing said mounting member to a vehicle support.

18. The visor system as defined in claim 17 wherein said guide means includes a slide member and a cap having a collar and wherein said slide member extends on one side of said slots and said cap extends on an opposite side.

19. The visor system as defined in claim 18 wherein said guide means further includes spring means for urging said slide member toward said cap.

20. The visor system as defined in claim 19 wherein said slide member comprises a washer-shaped member.

21. The visor system as defined in claim 20 wherein said spring means comprises a thrust washer surrounding said collar of said guide means.

22. A visor system comprising:
a curved visor panel;
a mounting member including means for securing said mounting member to a vehicle roof behind a vehicle headliner, wherein one of said visor panel and mounting member includes at least a pair of elongated slots formed therein; and
guide means extending through said slots for coupling said visor panel and mounting member for sliding movement along said slots wherein said guide members include means positioned on opposite sides of said slots and engaging the opposite surfaces of the member in which said slots are formed with a predetermined compression for providing the controlled sliding force for said visor panel.

23. A visor system for a vehicle comprising:
a curved visor panel including first and second spaced sets formed near one edge thereof;
a mounting member including a pair of parallel spaced slots formed therein and spaced a distance equal to the distance between said seats of said visor panel; and
guide means extending through said slots of said mounting member into said visor panel for providing a predetermined sliding force for said visor panel with respect to said mounting member as said visor panel slidably moves between a retracted position behind a vehicle headliner and an extended position covering a vehicle window.

* * * * *

UNITED STATES PATENT AND TRADEMARK OFFICE
CERTIFICATE OF CORRECTION

PATENT NO. : 5,211,439

DATED : May 18, 1993

INVENTOR(S) : Nels R. Smith, et al.

It is certified that error appears in the above-identified patent and that said Letters Patent is hereby corrected as shown below:

Column 3, Line 34;

"pocket" should be --pockets--;

Column 8, Claim 23, Line 10;

"sets" should be --seats--.

Signed and Sealed this

Nineteenth Day of April, 1994

*Attest:*

BRUCE LEHMAN

*Attesting Officer*  *Commissioner of Patents and Trademarks*